Sept. 24, 1935.　　　　I. J. LARSON　　　　2,015,528
INTERMITTENT FEED MECHANISM
Filed Aug. 26, 1933
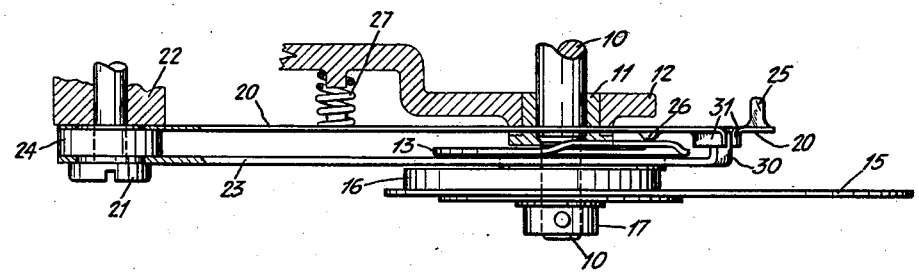
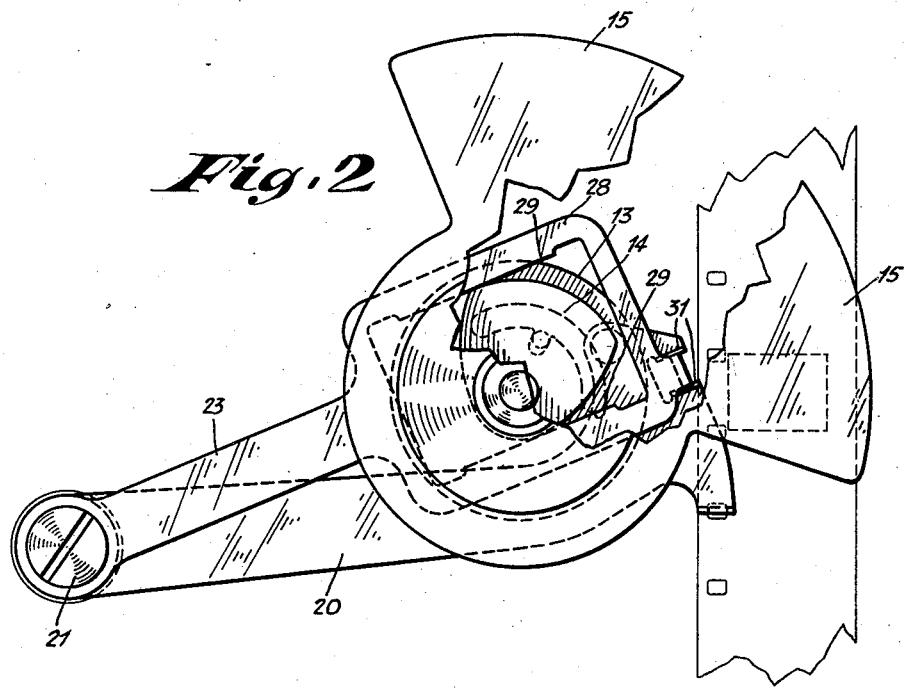
INVENTOR
INER J. LARSON
BY
ATTORNEY Patented Sept. 24, 1935

2,015,528

UNITED STATES PATENT OFFICE 2,015,528

INTERMITTENT FEED MECHANISM

Iner J. Larson, Oaklyn, N. J., assignor to Radio Corporation of America, a corporation of Delaware Application August 26, 1933, Serial No. 686,873

3 Claims. (Cl. 88—18.4)

This invention relates to intermittent feed mechanism and particularly the type thereof which is used to feed motion picture film intermittently past a picture provided either in a camera or in a projector.

The particular feed mechanism of this invention is peculiarly adapted for use in a camera and more specifically the type of camera used for 16 mm. film and actuated by a spring motor.

One object of the invention is to provide an intermittent feed mechanism which is operated by a very small amount of power.

Another object of the invention is to provide such an apparatus which has extremely light moving parts for the purpose of decreasing noise and vibration.

Another object of the invention is to provide an intermittent feed mechanism wherein the number of parts requiring extreme precision in their manufacture is relatively small.

Another object of the invention is to provide an intermittent feed mechanism which is extremely compact in order that the camera case may be of relatively small dimensions.

Referring now to the drawing:

Fig. 1 is a top view of the mechanism, and

Fig. 2 is a front view thereof, i. e. looking toward the mechanism from the front of the camera.

Referring first to Fig. 1, 10 is the drive shaft of the mechanism which is journaled in a bushing 11 carried in a portion of the frame of the camera 12.

The shaft 10 carries fixed thereto the cam 13, the cam 14 (Fig. 2), the shutter 15, the shutter counterweight 16 and the bushing 17, all of which members are assembled into a unit and fixed rigidly to the shaft. The film actuating arm 20 is formed of thin spring steel and is pivoted upon the screw 21 which is fastened into a portion of the camera frame 22, the arm 20 being held spaced from the arm 23 hereinafter described by the bushing 24.

The arm 20 has at its outer end a turn-up pin 25 shaped to engage the perforations in the film, and it also has a small hemispherical extrusion 26 to co-operate with the face of the cam 13.

A spring 27 assists in maintaining the projection 26 on the arm 20 firmly against the cam 13, which cam thereby provides the in-and-out motion for the pin 25 in relation to the film.

The up-and-down motion of the arm 20 is provided by the arm 23 which, like the arm 20, is pivoted on the screw 21. The arm 23 includes a rectangular frame portion 29 having two faces 29 adapted to co-operate with the cam 14 which thereby moves the arm 23 up and down. The arm 23 is provided with a laterally extending portion 30 which has a snug sliding fitting between the turned-up portions 31 on the arm 20 whereby the outer portion 25 of the arm 20 can be moved in and out by the cam 13.

The shutter 15 is constructed in the usual manner of thin sheet metal and properly counterbalanced and is, as usual, timed so as to close the aperture during the downward movement of the film.

The operation of the mechanism is obvious from the foregoing description. The cam 13 presses the pin 25 into an aperture of the film at the time the shutter closes, as shown in Fig. 2; the cam 14 then moves the film 28 and arm 23, and thereby the arm 20 and the pin 25 downwardly to the lowermost position thereof, whereupon the cam 13 permits the spring 27 to withdraw the pin 25 from the perforation in the film, the shutter opens and during the exposure of the film the pin 25 is returned to its initial position by the action of the cam 14 while held out of contact by the spring 27.

Having described my invention, I claim

1. Intermittent feed mechanism comprising a pivotally mounted film actuating arm rigid in the direction of film feed and flexible in the perpendicular direction, a spring flexing said arm away from the film, a cam for flexing said arm toward the film, and a coaxially pivoted arm connected to the first arm for actuating said arm about a pivot.

2. Intermittent feed mechanism comprising a pivotally mounted film actuating arm rigid in the direction of film feed and flexible in the perpendicular direction, a spring flexing said arm away from the film, a cam for flexing said arm toward the film, an additional arm pivoted co-axially with said first arm and connected thereto for actuating said first arm about its pivot, and a second cam actuating the second arm about the said pivot.

3. Intermittent feed mechanism comprising a pivotally mounted film actuating arm rigid in the direction of film feed and flexible in the perpendicular direction, a spring flexing said arm away from the film, a cam for flexing said arm toward the film, an additional arm pivoted axially with said first arm for actuating said first arm about its pivot, a second cam actuating the second arm about the said pivot, the said arms being slidably connected at the end opposite the said pivot.

INER J. LARSON.